United States Patent [19]

DeForrest

[11] 4,171,712
[45] Oct. 23, 1979

[54] FUEL TANK VENTING VALVE

[75] Inventor: Allen L. DeForrest, Auburn, Wash.

[73] Assignee: PACCAR Inc., Bellevue, Wash.

[21] Appl. No.: 842,598

[22] Filed: Oct. 17, 1977

[51] Int. Cl.² .............................................. F16K 15/02
[52] U.S. Cl. ............................. 137/513.5; 137/516.27; 137/529; 137/538
[58] Field of Search .......... 137/513.5, 516.25, 516.27, 137/529, 538; 220/203

[56] References Cited
U.S. PATENT DOCUMENTS

| 731,218 | 6/1903 | Perkins | 137/529 |
|---|---|---|---|
| 2,016,278 | 10/1935 | Ehlers | 137/529 X |

Primary Examiner—Robert G. Nilson
Attorney, Agent, or Firm—Seed, Berry, Vernon & Baynham

[57] ABSTRACT

A venting valve connected to the interior of the fuel tank has a sliding piston and a plurality of springs which hold the piston in different operative positions dependent upon the amount of pressure within the tank.

5 Claims, 6 Drawing Figures

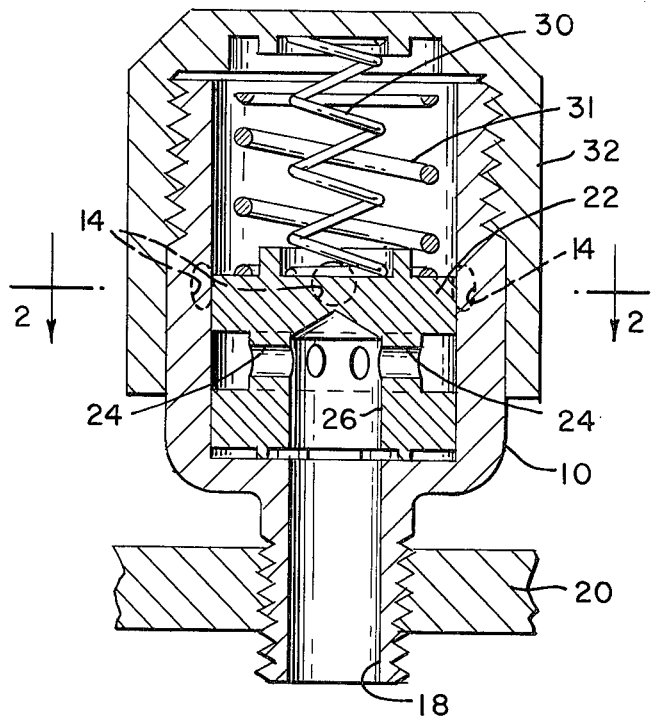
FIG. 1
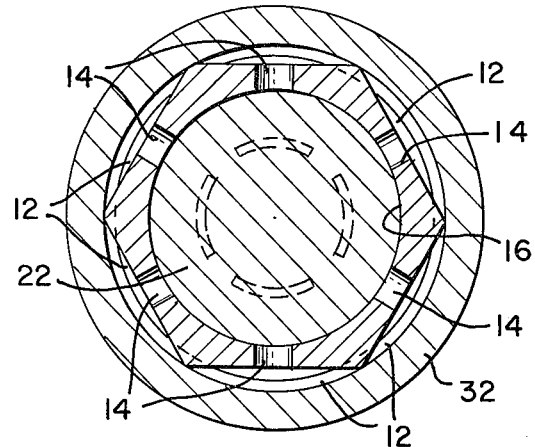
FIG. 2
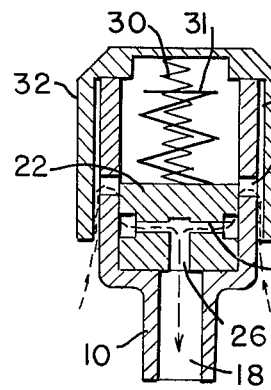 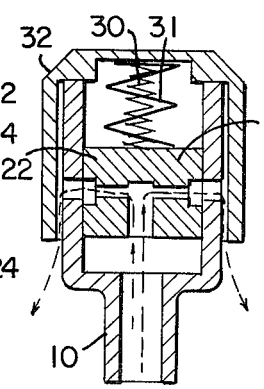 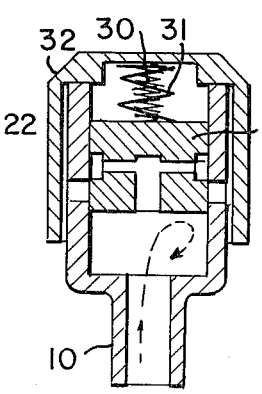 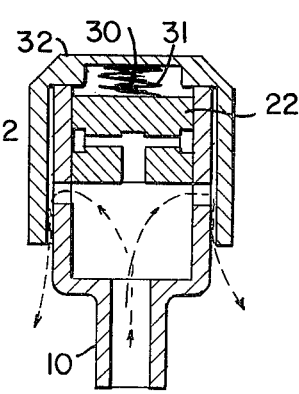
FIG. 3A    FIG. 3B    FIG. 3C    FIG. 3D

FUEL TANK VENTING VALVE

BACKGROUND OF THE INVENTION

This invention pertains to venting devices for diesel fuel tanks of the type having heated excess fuel returning to the tank.

SUMMARY OF THE INVENTION

It is an object of this invention to provide an inexpensive fuel tank vent which will not leak fuel during impact spurts or overturning of the vehicle, will allow inward passage of air to replace consumed fuel and will vent high-pressure gases from within the tank during normal running operations and excessive pressure conditions.

Basically these objects are obtained by providing a main body having discharge ports and communicating with the interior of the fuel tank. Within the main body is a slidable piston having ports which will communicate with the discharge ports during different operative conditions. A pair of springs or a dual spring rate spring means holds the piston in different positions with the lighter spring aligning the ports during normal excess fuel conditions of the engine and the greater spring rate disaligning the ports during excessive fuel spurts to prevent leakage of fuel from the tank.

BRIEF DESCRIPTION OF THE FIGURES OF THE DRAWING

FIG. 1 is a diametrical section through the fuel tank vent embodying the principles of the invention.

FIG. 2 is a transverse section taken along the line 2—2 of FIG. 1.

FIGS. 3A-3D are schematic operational views of the fuel vent.

DETAILED DESCRIPTION OF THE PREFERRED EMBODIMENTS

The fuel tank venting valve includes a main body 10 having flats 12 in which are provided discharge ports 14. The discharge ports communicate with a cylindrical interior wall or bore 16 that connects via passage 18 to the interior of the fuel tank 20.

Slidably positioned within the bore 16 is a cylindrical piston 22 having radial ports 24 that communicate with an internal passage 26. The passage 26 communicates with the passage 18 in the main body.

The piston is held in its positions by a pair of springs including a lightweight spring 30 and a heavier spring 31. As best seen in FIG. 1 the heavy spring is not engaging the end wall of a cap 32 which is threadably secured to the main body. The gap between the heavy spring 31 and the cap allows the lighter weight spring 30 to control the position of the piston during lighter internal pressures inside the tank 20. The amount of spring force applied can also be varied by the position of the cap 32 relative to the main body 10.

The operation of the valve is best shown in the schematic FIGS. 3A-3D. In FIG. 3A the piston is shown in a position in which there is no or little internal pressure within the tank. Air from the exterior of the tank can pass through the ports 14, pass between the piston and the cylindrical surface 16 and enter the tank to make up for the volume of fuel consumed by the engine. This assures that the tank is not subjected to excessive vacuum pressure. The volume of air required is very small (about 1 cu. ft. per hour) and is caused by less than ½ pound psig vacuum. This small amount of air can leak between the piston and the cylindrical surface whereas larger amounts of air or hot gases or fuel cannot readily pass between the piston and the cylindrical surface.

In FIG. 3B the piston is shown such that the ports 14 and 24 are in alignment and the spring 30 slightly compressed. This condition occurs during normal running operations of the vehicle. The diesel engine receives considerable more fuel than it consumes and returns the excess fuel to the tank. This excess fuel is heated in the engine and mixed with hot combustion gases so that the returning volume is about 0.5 cu. ft. per min. causing a pressure to the tank is in the vicinity of 2 to 3 psig. These expanded gases and combustion gases are thus free to be vented to the atmosphere.

FIG. 3C shows a condition where there is a transient high-pressure spike such as about 30 psig. This occurs from a crash or other impact against the fuel tank and shifts the piston upwardly compressing the heavier spring 31 so that liquid fuel cannot pass out of the discharge ports 14.

FIG. 3D shows a pop-off condition which occurs when the internal pressure in the tank approaches the structural strength capability of the tank approximately 50 psig. When the pressure reaches this amount, the larger spring 31 is compressed with the piston sliding past the ports 14 to completely relieve the fuel tank.

The remaining condition is an overturn situation with the small spring 30 being capable of holding the piston fully closed to withstand the pressure of the fuel in the tank which is approximately 2 psig.

As is readily apparent, the vent valve is very simple in construction but serves a multitude of safety functions. While the preferred embodiment of the valve has been illustrated and described, it should be understood that variations will be apparent to one skilled in the art without departing from the principles herein. Accordingly, the ininvention is not to be limited to the specific embodiment illustrated in the drawing.

I claim:

1. A fuel tank vent for diesel burning vehicles comprising:
   a main body having a passage communicating with the interior of the fuel tank and ports communicating with the outside of the tank,
   a regulating piston slidably mounted in said main body for exposing said ports,
   first and second springs with low and high, spring rates, respectively, abutting the piston for resisting sliding movement whereby the piston and body are operative for passing small volumes of air into the tank to displace consumed fuel, passing larger volumes of heated pressurized gases caused by returned fuel out to the exterior of the tank, blocking passage of liquid fuel during overturn or impact, and passing larger volumes of fuel and gases to the exterior of the tank when internal pressures approach the bursting strength of the tank, said piston having an internal conduit and transverse ports, said first spring holding the piston inwardly with the body and piston ports blocked but allowing low volume air to pass into the tank and holding the piston ports and body ports in alignment for discharging higher pessure, larger volumes of gases from within the tank, said second spring providing limited additional movement of the piston to move the piston and main body ports again out of alignment from temporary internal high pressure spurts greater than said heated gas pressure from returned fuel, said second spring providing full opening of the main body ports by allowing still additional sliding of the piston to relieve greater internal pressures reaching the bursting strength of the tank.

2. The vent of claim 1, including an axial adjustable cap covering said main body and abutting said first spring for varying the force applied by the first spring.

3. The vent of claim 2, said main body having a plurality of flats for providing openings between the main body ports and the cap.

4. A fuel tank vent for a vehicle having a diesel fueled engine comprising:
 a main body having an inner surface, a passage communicating with the interior of the fuel tank and sidewall ports communicating with the outside of the tank,
 a regulating piston slidably mounted in said main body and having sidewall ports alignable with said main body ports for connecting said main body ports with said passage and having an outer piston surface opposed to said main body inner surface,
 a clearance space between the opposed surfaces of the main body and the piston for allowing controlled volumes of air into the tank to displace consumed liquid fuel but said clearance space blocking any substantial liquid fuel flow out of said tank during an overturn of the tank,
 spring means having a first spring force for holding the piston ports out of alignment with the main body ports to allow air only in through said clearance space, a second spring force greater than said first spring force for allowing axial movement of the piston ports into alignment with the main body ports for exhausting larger volumes of heated pressurized gases caused by returned fuel out to the exterior of the tank, a third spring force greater than said second spring force for allowing axial movement of the piston ports again out of alignment with the main body ports to block substantive flow of liquid fuel out of the tank during overturn or impact of the tank, and a fourth spring force greater than said third spring force for allowing movement of the piston into a final further axial position wherein liquid fuel can escape through said main body ports when the tank internal pressure approaches the bursting strength of the tank.

5. The vent of claim 4, said main body having a non-circular external surface surrounding said main body ports, and including a cylindrical cover threaded onto said main body holding said springs against said piston and encircling said main body ports to protect said main body ports without restricting air or liquid fuel flow through said main body ports.

* * * * *